United States Patent
Sørensen et al.

(10) Patent No.: US 9,950,910 B2
(45) Date of Patent: *Apr. 24, 2018

(54) METHOD FOR CONTROLLING THE ORIENTATION OF A LOAD SUSPENDED FROM A BEARING WIRE ABOUT SAID BEARING WIRE AND A WINCH ARRANGEMENT

(71) Applicant: ELTRONIC A/S, Hedensted (DK)

(72) Inventors: Bjarne Nørgaard Sørensen, Ejby (DK); Hans Rico Larsen, Nr. Snede (DK)

(73) Assignee: Eltronic A/S, Hedensted (DK)

( * ) Notice: Subject to any disclaimer, the term of this patent is extended or adjusted under 35 U.S.C. 154(b) by 190 days.

This patent is subject to a terminal disclaimer.

(21) Appl. No.: 14/996,257

(22) Filed: Jan. 15, 2016

(65) Prior Publication Data

US 2016/0200553 A1    Jul. 14, 2016

Related U.S. Application Data

(63) Continuation of application No. 13/574,031, filed on Sep. 11, 2012, now Pat. No. 9,238,569.

(51) Int. Cl.
*B66C 23/18* (2006.01)
*B66C 13/08* (2006.01)
(Continued)

(52) U.S. Cl.
CPC ............ *B66C 23/185* (2013.01); *B66C 13/08* (2013.01); *B66C 15/065* (2013.01); *B66D 1/505* (2013.01); *Y02B 10/30* (2013.01)

(58) Field of Classification Search
CPC ....... B66C 23/185; B66C 13/08; B66C 13/06; B66C 15/065; B66D 1/505; Y02B 10/30
See application file for complete search history.

(56) References Cited

U.S. PATENT DOCUMENTS 3,367,297 A * 2/1968 Berger ...................... B63C 7/04
                                                    114/326
3,567,040 A * 3/1971 Thomson ................ B63B 27/04
                                                    212/242
(Continued)

FOREIGN PATENT DOCUMENTS

WO        2008061797 A1    5/2008

*Primary Examiner* — Michael E Gallion
(74) *Attorney, Agent, or Firm* — James Creighton Wray; Meera P. Narasimhan

(57) ABSTRACT

A method for controlling the orientation of a load (18) suspended from a bearing wire (16) about said bearing wire (16), comprising the following steps:

a.—providing a winch arrangement (10), comprising; one master winch (32), one slave winch (34) and a winch control system (31), each of said winches (32, 34) having a winch motor (58) and a bi-directional rotational spool (54) with a tagline (40, 42), wherein the winches (32, 34) are placed on the ground, on the crane or on the load, wherein each tagline (40, 42) is provided with attachment means (44, 46) for attachment to the load (18) and for applying a controlled torque to the load (18) about the bearing wire (16), and wherein the control system (31) comprises tension sensor means (48) for determining tagline tension and spool rotation sensor means (50) for determining spool rotation, and wherein the control system (31) is controllably connected to each winch motor (58) for controlling spool rotation, b.—connecting the attachment means (44, 46) to the load (18), c.—simultaneous rotating the winch spools (54), until preset tagline tensions are sensed in the two taglines by the tension sensor means (48), d.—during horizontal and/or vertical movement of the load (18), rotating, if necessary, the spools (50) with a rotation speed, for maintaining a desired orientation of the load (18), based on the determined tagline tensions, (Continued)

e.—relieving the tagline tension by rotating the spools (50), and
f.—disconnecting the attachment means (44, 46) from the load (18).

21 Claims, 12 Drawing Sheets

(51) Int. Cl.
*B66C 15/06* (2006.01)
*B66D 1/50* (2006.01)

(56) References Cited

U.S. PATENT DOCUMENTS

| | | | | |
|---|---|---|---|---|
| 3,799,358 A * | 3/1974 | Putnam | B66C 13/08 | 212/242 |
| 3,838,846 A * | 10/1974 | Ostrom | B66D 1/48 | 254/275 |
| 3,858,728 A * | 1/1975 | Fathauer | B66C 1/663 | 212/259 |
| 3,860,092 A * | 1/1975 | Holmes | A62B 1/02 | 182/101 |
| 3,885,676 A * | 5/1975 | Wilson | B66C 1/663 | 212/167 |
| 4,063,770 A * | 12/1977 | Guthrie | B66C 1/101 | 294/81.41 |
| 4,111,281 A * | 9/1978 | Jacobs | A62B 1/02 | 182/10 |
| 4,175,727 A * | 11/1979 | Clarke | B66D 5/26 | 192/12 R |
| 4,191,502 A * | 3/1980 | Komatsu | B63B 27/04 | 212/310 |
| 4,350,254 A * | 9/1982 | Noly | B66C 13/08 | 212/242 |
| 4,474,263 A * | 10/1984 | Christopher | B66B 9/00 | 182/10 |
| 4,547,857 A * | 10/1985 | Alexander | B66D 1/525 | 212/308 |
| 4,597,497 A * | 7/1986 | Aberegg | B66D 1/54 | 212/274 |
| 4,610,365 A * | 9/1986 | Roed | B66C 23/605 | 212/262 |
| 4,883,184 A * | 11/1989 | Albus | B66C 13/06 | 212/195 |
| 4,932,541 A * | 6/1990 | Belsterling | B66C 13/02 | 212/271 |
| 5,018,922 A * | 5/1991 | Yoshinada | B25J 3/04 | 414/5 |
| 5,351,430 A * | 10/1994 | Hystad | A01K 73/06 | 254/273 |
| 5,790,407 A * | 8/1998 | Strickland | G05B 19/042 | 212/284 |
| 6,039,193 A * | 3/2000 | Naud | B66C 23/12 | 212/167 |
| 6,073,496 A * | 6/2000 | Kuhn | B66C 1/40 | 73/862.56 |
| 6,079,576 A * | 6/2000 | Bosler | B66D 1/44 | 212/278 |
| 6,126,023 A * | 10/2000 | Durrant-Whyte | B66C 13/06 | 212/274 |
| 6,199,442 B1 * | 3/2001 | Bauer | B66C 23/94 | 188/31 |
| 6,439,407 B1 * | 8/2002 | Jacoff | B66C 13/06 | 212/272 |
| 6,648,303 B1 * | 11/2003 | Nishimoto | B66D 1/08 | 254/361 |
| 6,834,824 B1 * | 12/2004 | Smith | B65H 18/16 | 242/530.1 |
| 6,968,963 B1 * | 11/2005 | Zakula, Sr. | B66C 1/28 | 212/270 |
| 6,985,085 B1 * | 1/2006 | Brown | B66C 15/065 | 212/276 |
| 7,138,925 B2 * | 11/2006 | Nield | B66D 1/40 | 212/276 |
| 7,367,464 B1 * | 5/2008 | Agostini | B66C 13/063 | 212/308 |
| 8,167,154 B2 | 5/2012 | Heidrich | | |
| 9,238,569 B2 * | 1/2016 | Sorensen | B66C 23/185 | |
| 9,346,656 B2 * | 5/2016 | May | B66C 13/06 | |
| 2002/0144967 A1 | 10/2002 | Jacoff | | |
| 2003/0227010 A1 * | 12/2003 | Petrak | B60T 11/046 | 254/294 |
| 2004/0094497 A1 * | 5/2004 | Oja | B66C 13/06 | 212/274 |
| 2004/0118635 A1 * | 6/2004 | Sun | A62B 1/06 | 182/142 |
| 2006/0192188 A1 * | 8/2006 | Sanders | B66D 1/485 | 254/361 |
| 2009/0028647 A1 * | 1/2009 | Bingham | B63B 27/10 | 405/195.1 |
| 2009/0294746 A1 * | 12/2009 | Heidrich | B66D 1/44 | 254/375 |
| 2010/0206831 A1 * | 8/2010 | Faust | B66D 1/26 | 212/278 |
| 2010/0237306 A1 * | 9/2010 | Eschelbacher | B66D 1/12 | 254/362 |
| 2011/0221215 A1 * | 9/2011 | Botwright | B66C 1/108 | 294/81.4 |
| 2011/0251803 A1 * | 10/2011 | Teurlay | G01L 5/103 | 702/43 |
| 2012/0168397 A1 * | 7/2012 | Lim | B66C 13/063 | 212/273 |
| 2012/0328408 A1 * | 12/2012 | Sorensen | B66C 23/185 | 414/816 |
| 2014/0300112 A1 * | 10/2014 | Lee | E02D 31/002 | 290/55 |
| 2016/0200553 A1 * | 7/2016 | Sorensen | B66C 13/08 | 212/273 |
| 2017/0015530 A1 * | 1/2017 | Southerland, Jr. | B66C 13/06 | |

* cited by examiner

METHOD FOR CONTROLLING THE ORIENTATION OF A LOAD SUSPENDED FROM A BEARING WIRE ABOUT SAID BEARING WIRE AND A WINCH ARRANGEMENT

This application is a continuation of application Ser. No. 13/574,031 filed Sep. 11, 2012, which claims the benefit of Danish Application No. PA 2010 70017 filed Jan. 19, 2010 and PCT/DK2011/050012 filed Jan. 18, 2011, International Publication Number WO 2011/088832, all of which are hereby incorporated by reference in their entirety as if fully set forth herein.

FIELD OF THE INVENTION

The present invention relates to a method for controlling the orientation of a load suspended from a bearing wire about said bearing wire Furthermore the present invention relates to a winch arrangement, for controlling the orientation of a load suspended from a bearing wire about said bearing wire, comprising; one master winch, one slave winch and a winch control system, each of said winches having a winch motor and a bi-directional rotational spool with a tagline, wherein each tagline is provided with attachment means, wherein the taglines are arranged for applying a controlled torque to the load about the bearing wire.

Additionally the present invention relates to the use of such a method and winch arrangement.

In the present application the term tagline is used for an elongate connection means connected between the load and a winch for transferring a force from the winch to the load. The tagline may be a rope, a cable, a wire or another tether. The tagline is able to transfer tension forces.

BACKGROUND OF THE INVENTION

When lifting loads of a substantial size it is a requirement that the orientation of the load is controlled. Examples of such loads may be wind turbine blades, towers, prefabricated concrete elements for buildings, etc.

Due to the inertia of the load the load may maintain its position in space even when the bearing wire is rotated, i.e. if the crane boom is rotated. Therefore an uncontrolled load may potentially impact the crane boom or impact personnel or structures close by. It is therefore a requirement that the load is controlled. For example by attaching a tagline to the load for applying a torque to the load about the bearing wire. The torque may be clockwise or counter clockwise.

Due to the size of the loads it is unsafe for personnel to handle the taglines and to apply the torque to the load about the bearing wire.

From WO 2008/061797 a method and a lifting device for mounting a wind turbine blade to a wind turbine hub are known. The blade is suspended in a substantially horizontal orientation from a bearing wire provided by a crane having a crane boom. The bearing wire is attached to the lifting device, which is attached to the blade. The blade is lifted from a position on the ground and to a position, where the blade may be mounted to the hub. In order to avoid that the blade rotates about the bearing wire the blade is connected to control wires, which run via pulleys on the crane boom to a winch arrangement at the bottom of the crane boom. The system applies one winch for controlling the orientation of the load and another manually operated winch for rotating the load.

Although the system of WO 2008/061797 has been successfully implemented there are some disadvantages of the system. A major disadvantage is that the crane needs to be modified. This normally requires approving from the crane manufacturer in order to guarantee the required functioning of the crane. The cranes are very expensive to operate and are only used for a short duration. A purpose modified crane would have much idle time, alternatively the pulleys, the winch arrangement and the control wires would have to be removed from the system of WO 2008/061797 between lifting operations at one site to free the crane for other uses.

OBJECT OF THE INVENTION

The object of the present invention is to provide a method and winch arrangement for controlling the orientation of a load suspended from a bearing wire in relation to said bearing wire, and which provide flexibility concerning the placement of the winch arrangement, such that it does not require to be installed on a crane.

DESCRIPTION OF THE INVENTION

According to the present invention, this objective is achieved by a method for controlling the orientation of a load suspended from a bearing wire about said bearing wire, comprising the following steps:

a.—providing a winch arrangement, comprising; one master winch, one slave winch and a winch control system, each of said winches having a winch motor and a bi-directional rotational spool with a tagline, wherein the winches are placed on the ground, on the crane or on the load, wherein each tagline is provided with attachment means, wherein the taglines are arranged for applying a controlled torque to the load about the bearing wire, and wherein the control system comprises tension sensor means for determining tagline tension and spool rotation sensor means for determining spool rotation, and wherein the control system is controllably connected to each winch motor for controlling spool rotation, b.—placing the winch free of the load and connecting the attachment means to the load, or b.—placing the winch on the load and connecting the attachment means to a land, c.—rotating the winch spools, until preset tagline tensions are sensed in the-taglines by the tension sensor means, d.—during horizontal and/or vertical movement of the load, rotating, if necessary, the spools with a rotation speed, for maintaining a desired orientation of the load suspended from the bearing wire about said bearing wire, based on the determined tagline tensions, e.—relieving the tagline tension by rotating the spools, and f.—disconnecting the attachment means.

Furthermore it is achieved by a winch arrangement, for controlling the orientation of a load suspended from a bearing wire about said bearing wire, comprising; one master winch, one slave winch and a winch control system, each of said winches having a winch motor and a bi-directional rotational spool with a tagline, wherein the winches are placed on the ground, on the crane or on the load, wherein each tagline is provided with attachment means, wherein the taglines are arranged for applying a controlled torque to the load about the bearing wire, which is peculiar in that the control system comprises tension sensor means for determining tagline tension and spool rotation sensor means for determining spool rotation, and wherein the control system is controllably connected to each winch motor for controlling spool rotation.

It is herewith achieved that the orientation of the load about the bearing wire is maintained autonomously without the need for user input apart from activating the winch arrangement.

The load is suspended from a bearing wire provided by a crane. When the crane operator manipulates the load, the winch arrangement will maintain the orientation by applying a controlled torque about the bearing wire, based on the tension sensor measurements according to the method. The crane operator may therefore fully concentrate on positioning of the load according to height, while operating the crane boom and/or a bearing wire winch, without having to operate a further winch for maintaining the orientation of the load about the bearing wire.

The tagline runs directly from the winch to the load or from the winch to a land. Therefore the method and winch arrangement is flexible regarding placement of the winch arrangement. For example the winch arrangement may be placed on the ground, on the crane or on the load.

The tagline is applying a torque about the bearing wire to the load. The tagline is flexible, so the tagline is in tension. The tagline force is tree-dimensional with two perpendicular horizontal components and a vertical component (z-component). One of the horizontal components (x-component) is directed from the attack point of the load towards the bearing wire and the other (y-component) from the attack point and perpendicular to the x-component. The controlled torque about the bearing wire is applied in a horizontal plane. The torque is composed by the y-component of the tagline force and the distance to the bearing wire (moment arm). The winch or the land is located sufficiently far from the load in the direction of the y-component to apply the necessary torque to control the load. The necessary distance is dependent of how much tagline force the winch is rated at, the moment of inertia of the load, the distance between the attack point and the bearing wire, the maximum lifting height and external forces ex the wind forces.

The relative relationship between the distance between the winch or the land and the load is as follows; a relatively long distance allow for a lower tagline force, a higher moment of inertia, a shorter moment arm, a higher maximum lifting height and/or higher external forces, whereas a winch or land located closer to the load needs a higher rating, less moment of inertia, a longer moment arm, a lower maximum lifting height and/or lower external forces.

The master winch and slave winch is arranged such that they apply opposite directed torque to the load. For example; the master winch applies a clockwise torque and the slave winch applies a counter-clockwise torque, the master winch applies a counter-clockwise torque and the slave winch applies a clockwise torque. When the sum of torque applied by the winches equal zero the load will maintain its orientation about the bearing wire.

The master winch and the slave winch may be located with an equal moment arm and symmetrical position in relation to the bearing wire or a different moment arm and an asymmetrical position in relation to the bearing wire. The control system is able to compensate during controlling of the winch motors.

The method and winch arrangement is typically used for controlling the orientation of a load of substantial size and/or weight suspended from a bearing wire about said bearing wire. Examples of such loads may be wind turbine blades, towers, prefabricated concrete elements for buildings, etc or other load with a large moment of inertia.

The load may be suspended from a crane with a bearing wire. The bearing wire may have an attachment means for connection to the load or a lifting frame attached to the load. For example the attachment means may be a hook. Alternatively the load may be suspended from a loader crane with an articulated arm installed on a truck or trailer. In this case the outer arm/hook may be regarded as the bearing wire as it may be freely rotatable and thus requiring the orientation of the load to be controlled about the axis of rotation.

Each winch may have a hydraulically or electrically driven winch motor driving a spool. The spool is able to rotate bi-directional either by a gearing or bi-directional rotation of the winch motor. The tagline, which may be a wire, cable or preferably a rope, is wound around the spool. The tagline is provided with attachment means for attachment to a land or the load either directly or via a lifting frame.

A control system is provided for controlling the operation of the winch motors. The winch motors may operate simultaneously with the same or dissimilar rotation speeds. Thus, the winch motors may operate individually. The control system comprises tension sensor means for determining the tension in the taglines and spool rotation sensor means for determining the position and the operation of the spool. The sensors are operating continuously during use of the system to provide feedback of the operation to the control system.

The control system may be provided with an output means for providing the sensor measurements to the crane operator or a data logger. Furthermore the control system may be provided with warning signals provided to the crane operator, when preset limits are about to be-/are exceeded. This will enable the crane operator to interrupt the lifting and bring the load into a safe condition if for example the wind conditions change and exceeds a predefined limit.

The master winch is set to maintain a preset tension in the tagline by the control system during the lifting and lowering of the load, the preset tension is set to provide a y-component exceeding the maximum expected wind force. When the tension is decreasing below the preset tension the master winch will wind to increase the tension back to the preset value and when the tension is increasing above the preset tension the master winch will unwind to lower the tension to the preset value. Rotating the spools with a rotation speed performs the winding/unwinding. The control system is controlling the spool rotation of the master winch by controlling the winch motor based on tension sensor measurements. The control system is using the spool rotation sensor measurement as feedback to verify correct spool rotation.

The slave winch may be set to follow the master winch. In a symmetrical condition the rotation speed of the slave winch is equal to the rotation speed of the master winch. In an asymmetrical the rotation speed of the slave winch is not equal to the rotation speed of the master winch.

When the load is lifted/lowered the distance between the load and the winch or land will vary. The tension sensor will detect and the changes in tagline tension and continuously determine the current tagline tension. The control system reacts by directing the spools of the master winch and slave winch to rotate as necessary to maintain the preset tension, such that the orientation of the load about the bearing wire is controlled autonomously.

In another embodiment the method according to the invention is peculiar in that in step c., the spools are rotated simultaneously.

It is herewith achieved that the load may stay perpendicular to a centreline through the crane.

In another embodiment the method according to the invention is peculiar in that in step d., adding/subtracting a rotation speed component to/from the rotation speed applied to the slave winch spool, for changing the desired orientation of the load suspended from the bearing wire about said bearing wire.

It is herewith achieved that the load may be rotated about the bearing wire in a controlled manner even while lifting/lowering the load. Thus, controlling the orientation of the load about the bearing wire.

It is often necessary to change the orientation of the load in the final stages of the lifting to position the load as necessary.

By adding a rotation speed component to the rotation speed of the slave winch the resulting speed will change the sum of torque about the bearing wire such that they no longer equal zero. The load will rotate about the bearing wire. The master winch will maintain the preset tension. By the method it is thereby ensured that the rotation is performed in a controlled manner without exceeding allowed tension limits. As the rotation is performed by adding to the existing speed of the spool of the slave winch, the part of the rotation of the spool will follow the master winch. It is therefore possible to lift or lower the load while rotating and still follow the wind/unwind function as directed by the change of distance between the winch and the load of a non-rotated system.

For example the spool of the master winch may rotate with a rotation speed to counteract an increased tension while lifting (unwind). If the load is required to rotate in a direction during the lifting, where the slave winch needs to wind, the rotation speed component will be opposite directed to the slave winch rotation speed which is following the master winch to counteract the tension increase caused by the lifting, thus, the resulting rotational speed of the slave winch will be slower than the master winch, zero or even opposite.

In a further embodiment of method according to the invention is peculiar in that changing the desired orientation of the load suspended from the bearing wire about said bearing wire is based on an input to the control system, wherein said input is either based on user input or pre-programmed.

The input is processed by the control system compensated for the influence of lifting/lowering the load while rotating.

The crane operator or other personnel may provide the input on an input console that is in communication with the control system. The input may also be based on distance measuring equipment or pre-programmed, thus allowing for a completely autonomous lifting.

In yet a further embodiment the method according to the invention is peculiar in that the method comprises further steps between step a. and b.:

a'.—providing each winch with winch attachment means for attachment of each winch to a support surface,
a".—providing a support surface for each winch, and
a'".—attaching each winch attachment means to each support surface.

It is herewith achieved that the winches may be installed in an easy and simple manner.

The attachment means may preferably be standardized, so that the winch may be installed on different support surfaces. The attachment means may be by permanent or non-permanent. For example by welding, by threaded fasteners, by pins or any other suitable means of attachment.

In another further embodiment the method according to the invention is peculiar in that the support surface is provided on a crane, the load, a lifting frame, a ship deck or on the ground.

It is herewith achieved that the same winch arrangement may be used in a number of different installations, which provides great flexibility.

In an embodiment of the invention the support surface is provided on the load or the lifting frame. The winch is located on the load or on the lifting frame. The taglines are attached to a land for example a ground anchor, to the crane ballast or another fixed point at or above ground level. It is thereby possible to apply a controlled torque to the load about the bearing wire for maintaining the orientation of the load about the bearing wire or for rotating the load about the bearing wire according to the method of the present invention.

In yet another further embodiment the method according to the invention is peculiar in that the method further comprises the steps of providing a spool torque sensor means for measuring the spool torque and converting the spool torque to tagline tension, for determining tagline tension.

This is a simple way of determining the tagline tension. The torque sensor may be a mechanical means of measuring the torque, a hydraulic pressure measurement on hydraulic winches and a current measurement on electrical winches.

In a further embodiment the method according to the invention is peculiar in that the method further comprises the steps of providing a strain gauge on each tagline for measuring the strain in each tagline and converting the tagline strain to tagline tension, for determining tagline tension.

This is another way of determining the tagline tension. This solution may provide an accurate result, but may be more difficult to realise.

In a further embodiment the winch arrangement according to the invention is peculiar in that the connection between the control system and the sensors and/or the control system and each winch motor is wireless.

It is herewith achieved that the control system may be located away from the sensors and winches.

This is especially advantageous because the system does not require electrical wiring to be applied between the various parts of the system. The system is therefore easy to install in temporary installations with a minimal installation time.

In a further embodiment the winch arrangement according to the invention is peculiar in that the control system further comprises an input console.

It is herewith achieved that the crane operator or another user may provide control input to the system to direct the control system to rotate the load about the bearing wire.

The input console may be wired or wirelessly connected to the control system.

DESCRIPTION OF THE DRAWING

The invention will be explained in more detail below with reference to the accompanying drawing, where.

DETAILED DESCRIPTION OF THE INVENTION

In the explanation of the figures, identical or corresponding elements will be provided with the same designations in different figures. Therefore, no explanation of all details will be given in connection with each single figure/embodiment.

Figure 1:
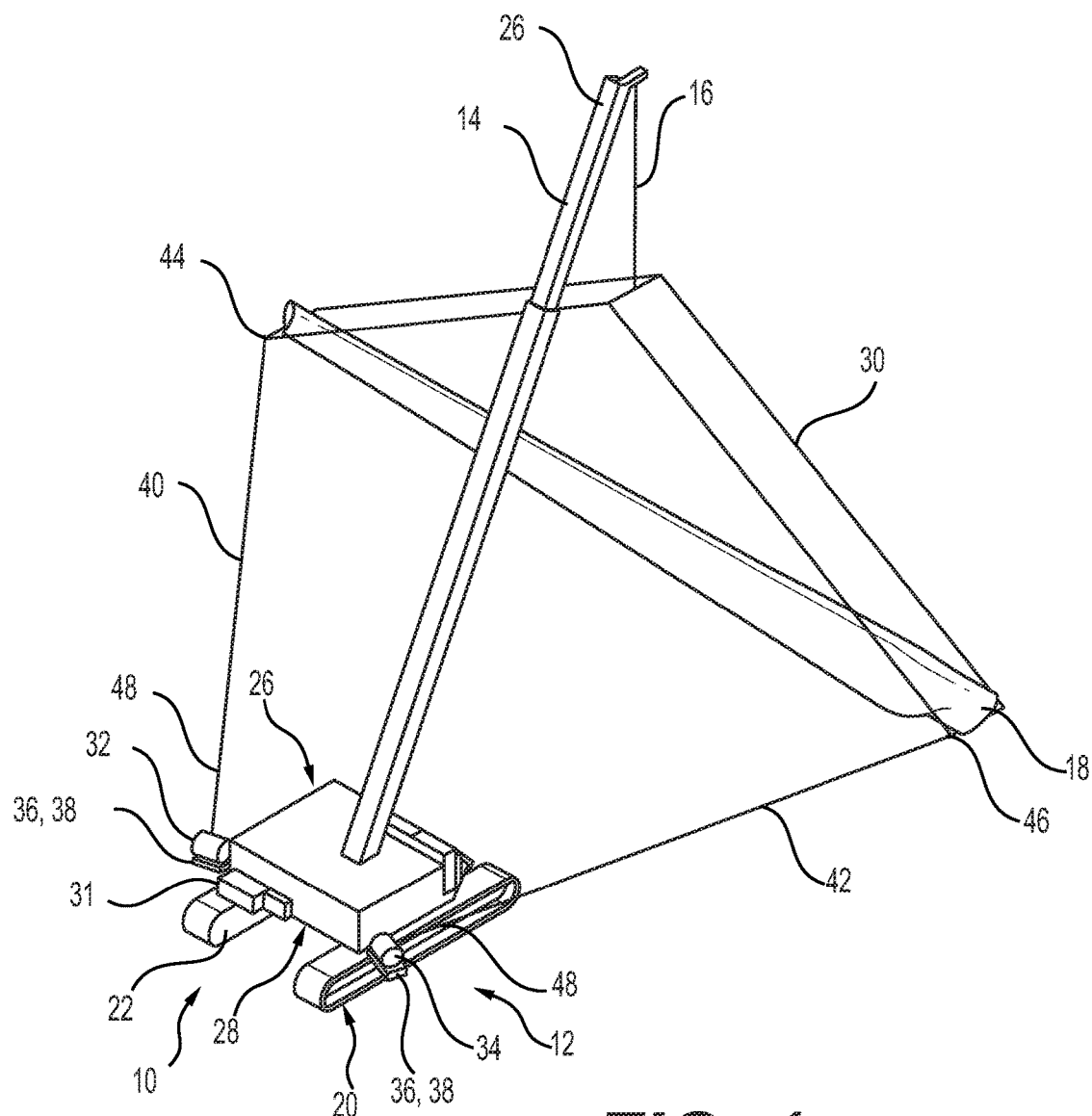
FIG. 1 shows a perspective view of a winch arrangement installed on a mobile crane having a crane boom with a bearing wire and a load suspended from the bearing wire.

FIG. 1 shows a perspective view of a winch arrangement 10 installed on a crawler crane 12 having a crane boom 14 with a bearing wire 16 and a load 18 suspended from the bearing wire 16. The load 18 is an elongate object, for example, a wind turbine blade.

The crane 12 comprises a substructure 20 with propulsive means 22 and a superstructure 24, which supports the crane boom 14. The crane boom 14 may be a telescopic boom. The bearing wire may run from a hoisting winch (not shown) in the superstructure 24 to the free end 26 of the crane boom 14 over pulleys (not shown). The superstructure 24 is connected to the substructure via a turntable 28 (see FIGS. 4, 5, 7 and 9), such that the superstructure 24 may rotate in relation to the substructure 20.

In the embodiment shown in FIGS. 1, 3 to 8 the winch arrangement 10, is arranged for installation onto a crawler crane 12. However, the winch arrangement 10, may also be arranged for installation on other supports. For example: the ground, a deck of a ship, a mobile crane, a railroad crane, a floating crane, a truck having a loader crane, the load, a lifting frame or a tower crane.

In the embodiment shown in FIGS. 1, 3 to 8 the load 18 is suspended from the bearing wire 16 via a lifting frame 30. As an alternative the load may be directly connected to rigging means of the bearing wire 16.

The winch arrangement 10 comprises a control system 31, a master winch 32 and a slave winch 34. Each winch 32, 34 having winch attachment means 36 for attachment to corresponding winch attachment means 38 on the crane 12. In the embodiment shown in FIGS. 1-8 the master winch 32 is located on the left side of the crane 12 and the slave winch 34 is located on the right side of the crane 12. In other embodiments the master winch 32 and the slave winch 34 may be interchanged.

Each winch 32, 34 hold a tagline 40, 42, which are attached to the load 18 by attachment means 44, 46 for attachment to the load 18. In the embodiment shown in FIGS. 1, 3 to 8 the tagline 40 connecting the master winch 32 to the load 18 is connected to the load 18 at the left side of the bearing wire 16 in relation to the forward direction of the crane 12 and the tagline 42 connecting the slave winch 34 to the load 18 is connected to the load 18 on the right side of the bearing wire 16 in relation to the forward direction of the crane 12.

Winding of the master winch 32 applies a counter clockwise (CCW) torque, as viewed from above, to the load 18 about the bearing wire 16. Winding of the slave winch 34 applies a clockwise (CW) torque, as viewed from above, to the load 18 about the bearing wire 16. Winding of both winches 32, 34 in such a way, that the CCW torque of the tagline 40 of the master winch 32 and the CW torque of the tagline 42 of the slave winch 34 are equal, will apply a resulting torque to the load 18 about the bearing wire 16 which is equal to zero.

When the load 18 is subject CCW torque about the bearing wire 16 the load 18 will change its orientation about the bearing wire 16 by turning in a CCW direction about the bearing wire 16. When the load 18 is subject CW torque about the bearing wire 16 the load 18 will change its orientation about the bearing wire 16 by turning in a CW direction about the bearing wire 16. When the load 18 is subject to a torque equal to zero about the bearing wire 16 the load 18 will maintain its orientation about the bearing wire 16.

It is thereby possible to control the orientation of the load 18 when it is suspended from the bearing wire 16 about said bearing wire 16.

The control system 31 comprises tension sensor means 48 for determining tagline tension and spool rotation sensor means 50 (see FIG. 2) for determining spool rotation. The control system 31 is controllably connected to each winch motor 52 (see FIG. 2) for controlling spool rotation.

The tension sensor means 48 may be a strain gauge on each tagline. The strain measured by the strain gauge, may be converted to tagline tension. The tension sensor means 48 may also be a spool torque sensor means. The spool torque measured by the spool torque sensor means, may be converted to tagline tension. For example the spool torque sensor means may be a current measurement device coupled to the winch motor 52 for measuring the current. The current may be converted to spool torque and the spool torque may be converted to tagline tension. Another example is a load cell provided in the winch attachment means 36. The load measured in the load cell may be converted to tagline tension. A further example is a load cell provided in the tagline attachment means 44, 46. The load measured in the load cell may be converted to tagline tension.

The spool rotation sensor means 50 may detect the rotational speed, the direction of rotation and the time duration of rotation of the spools 54 (see FIG. 2) and thereby determine the current length of the tagline.

Based on the input from the tagline tension sensor means 48 the control system 31 is able to control the winch motors 58 to rotate the spools 54 (see FIG. 2) in order to tension the taglines 40, 42 to control the torque about the bearing wire 16, such that the orientation of the load 18 suspended from the bearing wire 16 about said bearing wire 16 is maintained autonomously without input from the user/crane operator. The spool rotation sensor means 50 provide feed-back to the control system 31 to verify spool rotation.

Figure 2:
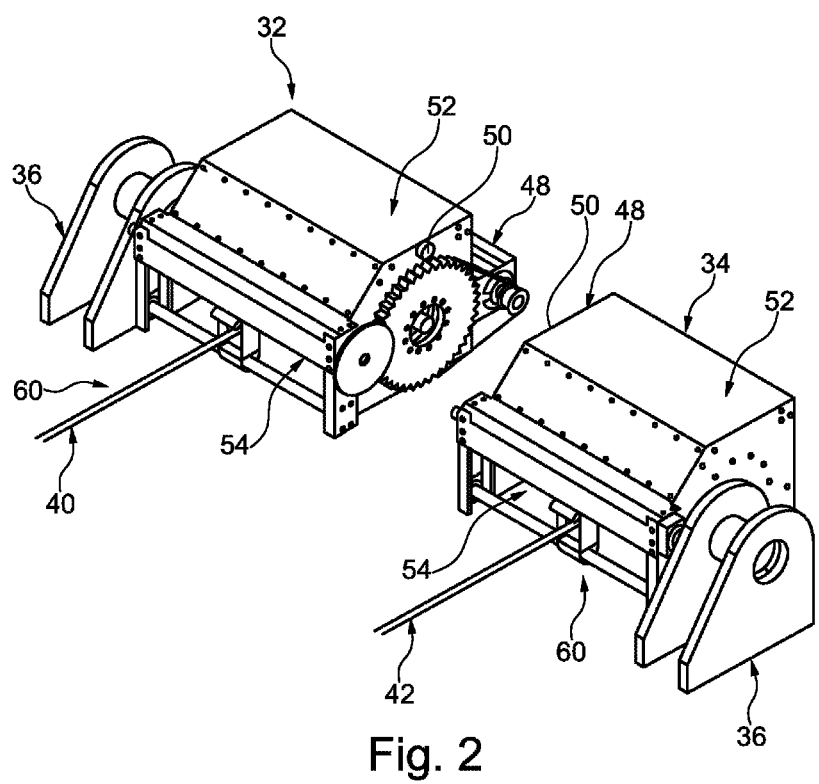
FIG. 2 shows a perspective view of a master winch and a slave winch.

FIG. 2 shows a perspective view of the master winch 32 and the slave winch 34. The winches 32, 34 are shown in a non-installed configuration.

Each winch 32, 34 have a winch motor 52 and a spool 54, which are provided inside a winch housing 56. The winch motor 52 is driving the spool 54, which is configured for bi-directional rotation, such that the winch 32, 34 may wind or rewind. A tagline 40, 42 is wound around each spool 54, 56. Each winch 32, 34 may have a wire guiding arrangement 60 for guiding the tagline 40, 42 onto the spool 54, 56 when rewinding.

In the embodiment shown in FIG. 2 each winch 32, 34 have attachment means 36 for attachment to the ground or a ship deck.

The method of controlling the orientation of the load 18 suspended from the bearing wire 16 about said bearing wire 16 will be described by example with reference to the figures shown different steps of the method.

Figure 3:
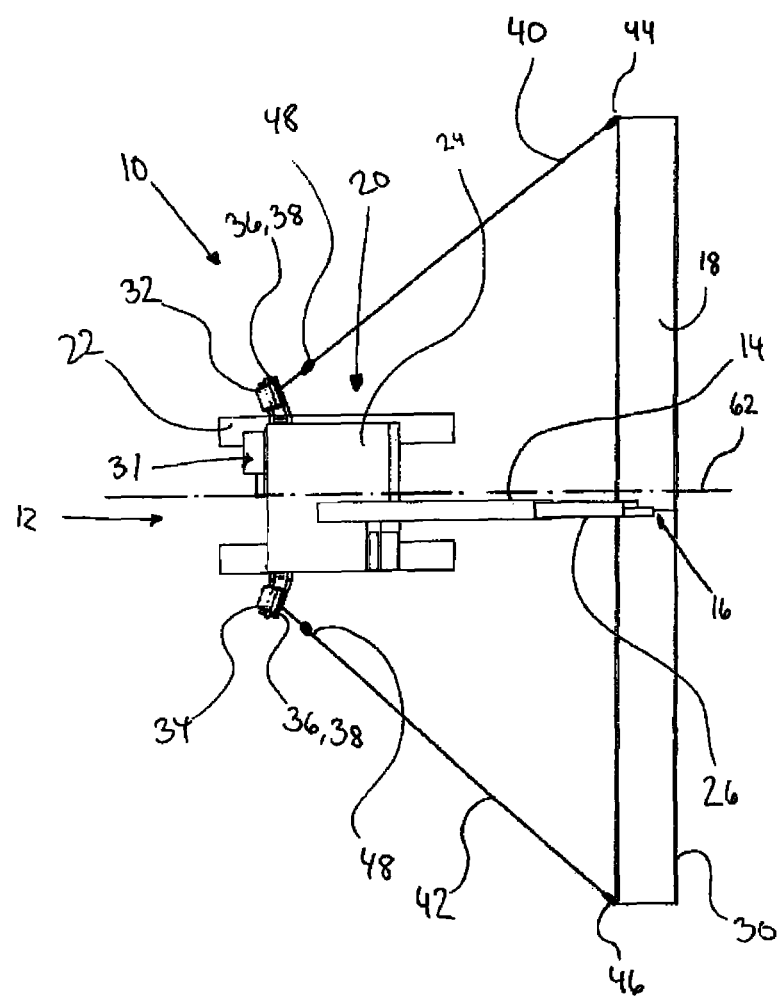
FIG. 3 shows a plan view of the winch arrangement and mobile crane of FIG. 1.

FIG. 3 shows a plan view of the winch arrangement 10 and mobile crane 12 of FIG. 1. The load 18 is suspended from the bearing wire 16. The orientation of the load 18 about the bearing wire 16 is perpendicular to a centreline 62 through the crane 12.

Figure 4:
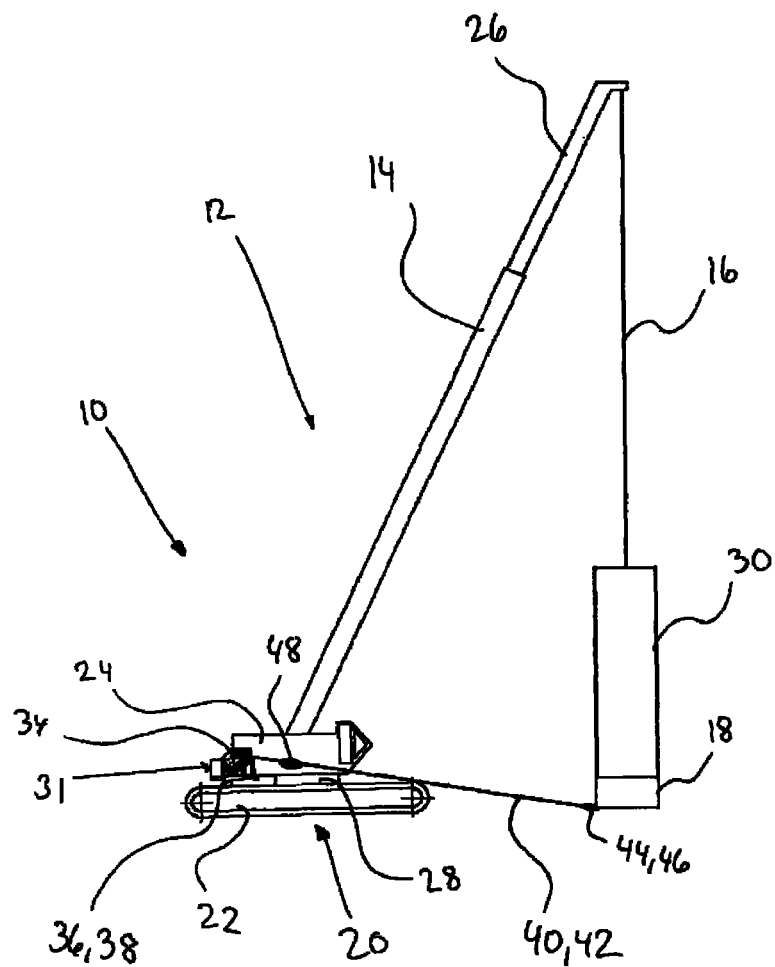
FIG. 4 shows a side view of the winch arrangement and mobile crane of FIG. 1, wherein the load is in a low position.

FIG. 4 shows a side view of the winch arrangement 10 and mobile crane 12 of FIG. 1. The load 18 is in a low position just free of the ground with the bearing wire 16 supporting the weight of the load 18. This would be the starting position for activating the winch arrangement 10 during lifting of the load 18 to a higher position and the finishing position, where the winch arrangement 10 is de-activated when lowering the load 18 from a higher position and the taglines 40 are disconnected from the load 18.

When the winch arrangement 10 is activated the spools 52 will start rotating in a direction for winding the taglines 40, 42. The tension in the taglines 40, 42 increase. The control system will continuously measure the tagline tension in the taglines 40, 42 sensed by the tension sensor means 48. When a preset tagline tension 40, 42 is achieved the control system will interrupt the rotation of the spools 52 by stopping the winch motors 52. The pretension in the taglines 40, 42 will cause the bearing wire to be offset from vertical by a small angle, which is not visible on the figures. The forces of the load 18 will have a vertical component caused by gravity pull and a horizontal component corresponding to—, but directed opposite, the horizontal component of the tagline tensions.

When the crane 12 starts lifting the load 18, and thereby starts moving the load in a vertical direction, the distance between the load 18 and the winches 32, 34 changes. This will be sensed by the tension sensor means 48 as a change in tagline tension. If the distance decreases, the tension will decrease and the control system 31 will direct the winch 32, 34 of the respective tagline 40, 42 wherein the lower tension is sensed, to wind, such that the tension increase until the preset tension is reached again. If the distance increases, the tension will increase and the control system 31 will direct the winch 32, 34 of the respective tagline 40, 42 wherein the lower tension is sensed, to unwind, such that the tension decrease until the preset tension is reached again.

When the position in FIG. 4 is reached after the load 18 has been lowered from a higher position, the spools rotate 54 in a direction so as to relieve the tagline tension. When the tagline 40, 42 has been relieved the winch arrangement 10 is de-activated and the attachment means 44, 46 may be disconnected from the load 18.

The winch arrangement 10 may thereafter be removed from the crane 12 or surface where it has been installed by disconnecting the winch attachment means 36.

In a condition with zero external forces in the horizontal plane ex from the wind, the master winch 32 and the slave winch 34 will wind or unwind simultaneously until the user/crane operator, operates the system to change the orientation of the load.

Wind forces will be countered by the preset tension, which is set to exceed the maximum expected wind force. Thus, the effect of the wind forces is negligible.

Alternatively it is possible to program the control system such that the nominal preset tension will be low in normal conditions. If the wind forces are exceeding the preset tension at the low value the control system may automatically increase the preset tension to a higher value until a maximum value is reached and the lifting must be terminated because of safety.

Alternatively it would also be possible to establish a communication between the control system of the winch arrangement and the control system of the crane, such that the winch arrangement control system may be able to discriminate influences from the wind and influence from the crane operation on the tagline tensions.

Figure 5:
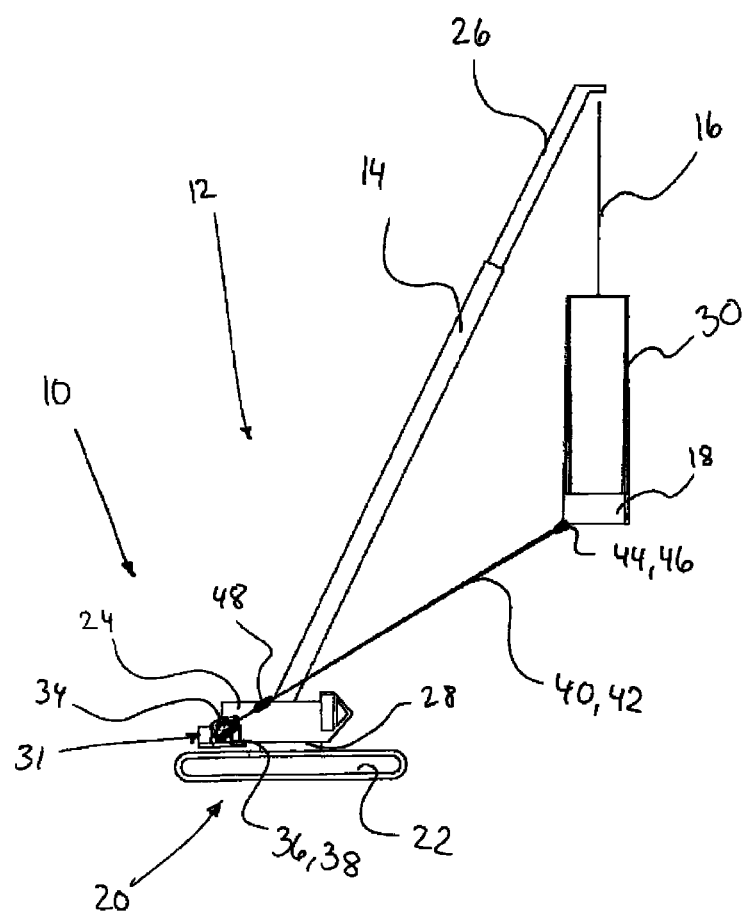
FIG. 5 shows a side view of the winch arrangement and mobile crane of FIG. 1, wherein the load is in a higher position.

FIG. 5 shows a side view of the winch arrangement 10 and mobile crane 12 of FIG. 1. The load 18 is in a high position. It will be noticed that the distance between the winches 32, 34 and the load 18 has increased. The winches 32, 34 have unwound the taglines 40, 42 to maintain the preset tension.

Figure 6:
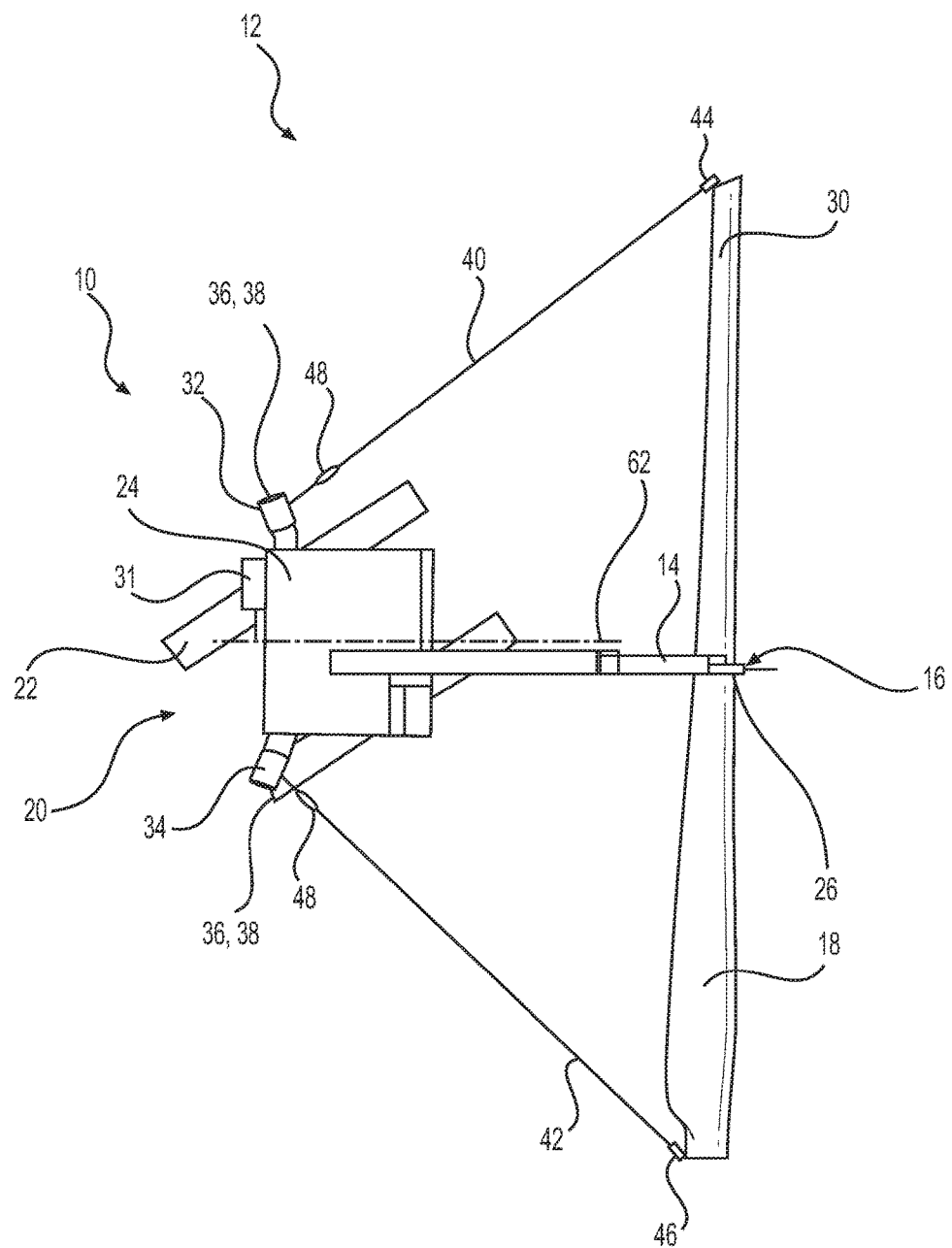
FIG. 6 shows a plan view of the winch arrangement and mobile crane of FIG. 1, wherein the load is in a higher position and the crane boom is rotated.
Figure 7:
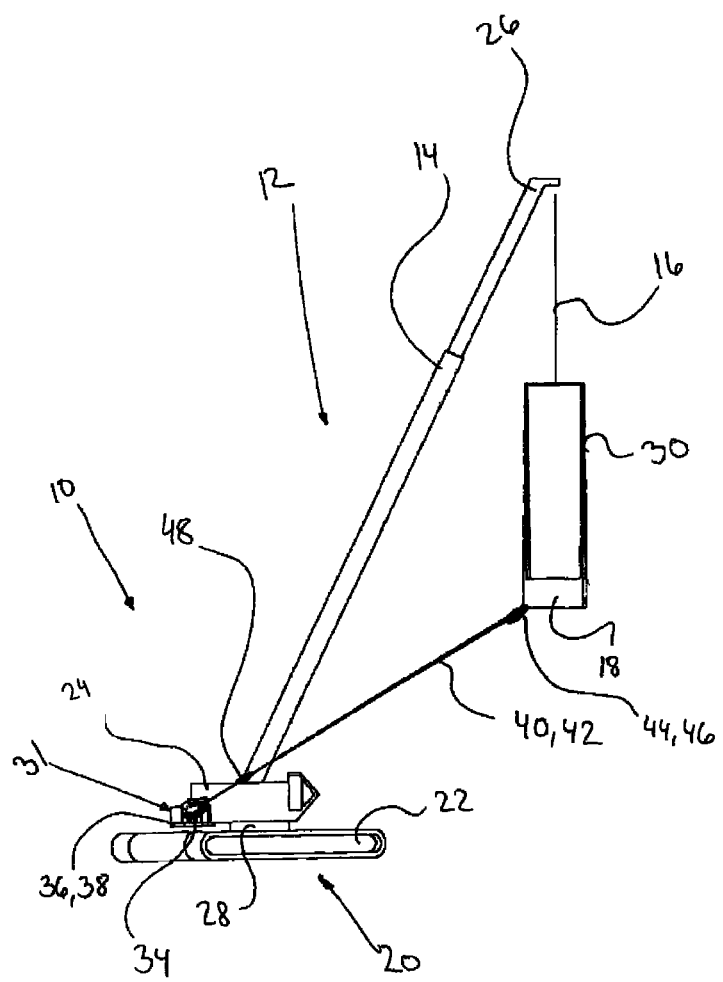
FIG. 7 shows a side view of the winch arrangement and mobile crane of FIG. 6.

FIG. 6 shows a plan view and FIG. 7 shows a side view of the winch arrangement 10 and mobile crane 12 of FIG. 1. The load 18 is in a higher position and the superstructure 24 with the crane boom 14 is rotated in relation to the substructure 20.

During rotation of the crane boom 14 the load 18 will try to maintain its orientation in space. However, this is compensated by the tagline tension, which will ensure that the orientation of the load 18 suspended from the bearing wire 16 about said bearing wire 16 is maintained.

Figure 8:
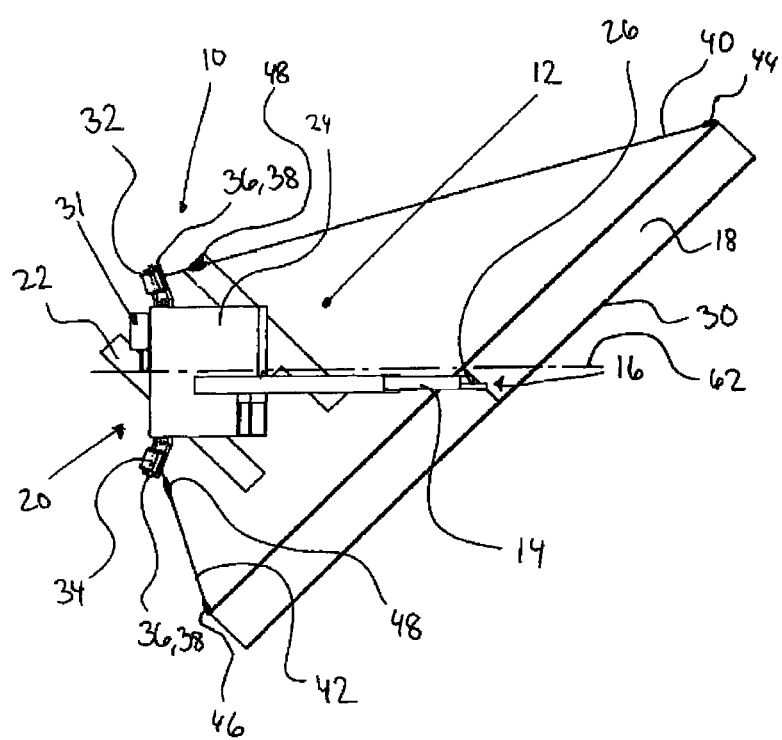
FIG. 8 shows a plan view of the winch arrangement and mobile crane of FIG. 6, wherein the load is rotated about the bearing wire.
Figure 9:
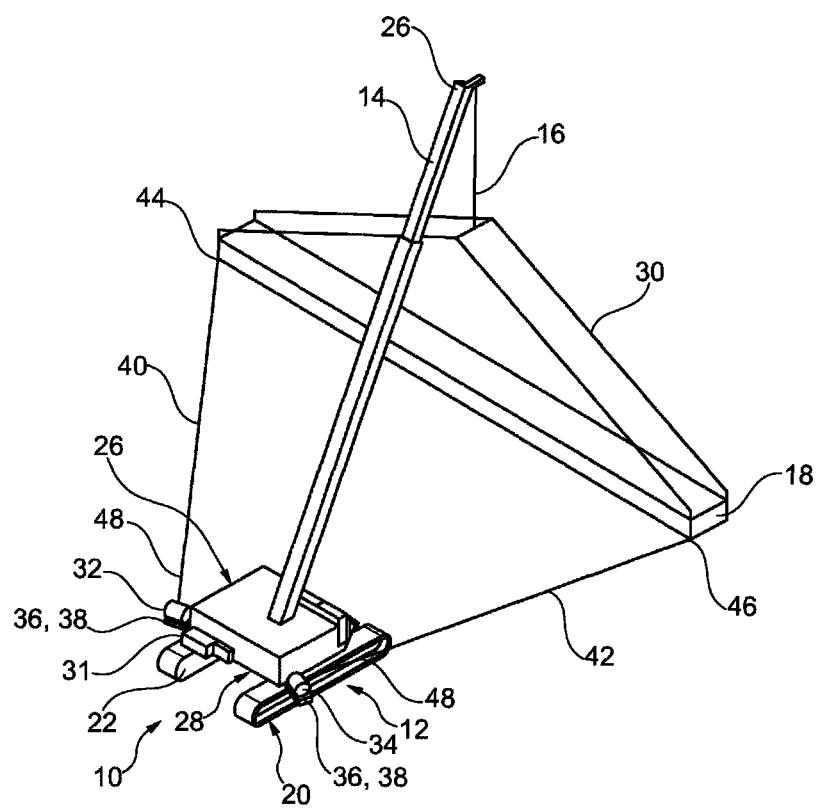
FIG. 9 shows a side view of the winch arrangement and mobile crane of FIG. 8

FIG. 8 shows a plan view and FIG. 9 shows a side view of the winch arrangement 10 and mobile crane 12 of FIGS. 6 and 7, wherein the load 18 is rotated about the bearing wire 16. The load 18 is rotated by rotating the spool 52 of the slave winch 34 according to the direction in which the load 18 should turn. The command to rotate the spool 52 of the slave winch is based on an input from a user. For example the crane operator.

Winding the slave winch 34 will apply a CW torque and unwinding the winch will apply a CCW torque. In FIG. 8 the slave winch 34 has been wound to achieve the rotated position of the load 18. While winding the slave winch will cause an increase of the tension in the tagline 40 of the master winch 32. The tension sensor means 48 will sense the increased tension and the control system 31 will command the master winch to unwind. The master winch 32 will unwind and maintain the preset tension in the tagline 40 of the master winch 32 until the slave winch 34 stops winding. The master winch 32 will stop and the preset tension in both taglines 40, 42 achieved and the winch arrangement will maintain the new orientation of the load 18 suspended from the bearing wire 16 about said bearing wire 16.

If the load 18 is installed to a support structure (not shown) the attachment means 44, 46 between the taglines 40, 42 and the load 18 may be disconnected after the tagline tension has been relieved, followed by rewinding of the now loose taglines 40, 42 and de-activation of the winch arrangement 10 and possibly disconnection of the winch attachment means 44, 46 and removal from the crane 12 or surface where it has been installed.

Figure 10:
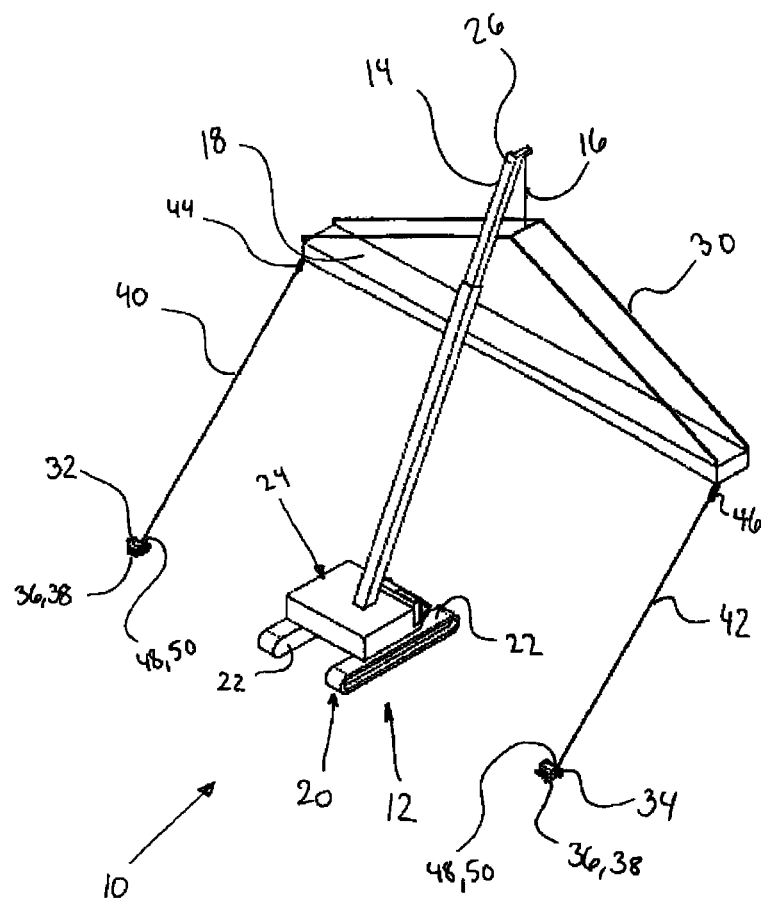
FIG. 10 shows a perspective view of a second embodiment.

FIG. 10 shows a perspective view of a second embodiment. The master and slave winches 32, 34 are installed in a configuration where the winches 32, 34 are located on the ground and placed side-by-side with the taglines 40, 42 attached to the load 18 at either side of the bearing wire 16. The taglines 40, 42 are preferably attached at or close to the ends of the load 18, because less force is required to apply the necessary torque about the bearing wire 16 to control the orientation of the load 18. Alternatively the taglines 40, 42 may be attached to the load 18 or a lifting frame closer to the centre of the load 18, but this will increase the forces required to apply the necessary torque about the bearing wire 16 to control the orientation of the load 18.

The implementation of this second embodiment provides a method and a winch arrangement 10, for controlling the orientation of a load 18 suspended from a bearing wire 16 about said bearing wire 16 without having to modify the crane 12.

Figure 11:
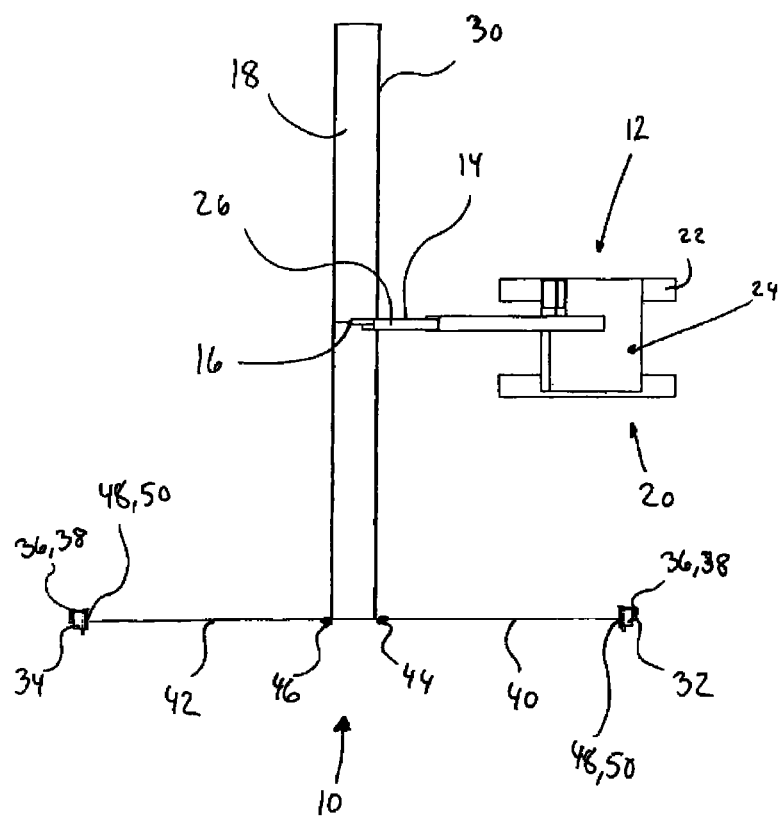
FIG. 11 shows a plan view of a third embodiment.

FIG. 11 shows a plan view of a third embodiment. The master and slave winches 32, 34 may be installed in a configuration where the winches 32, 34 are located on the ground and placed opposite each other with the taglines 40, 42 attached to the load 18 at one side of the bearing wire 16. The taglines 40, 42 are preferably attached at or close to the end of the load 18, because less force is required to apply the necessary torque about the bearing wire 16 to control the orientation of the load 18. Alternatively the taglines 40, 42 may be attached to the load 18 or a lifting frame closer to the centre of the load 18, but this will increase the forces required to apply the necessary torque about the bearing wire 16 to control the orientation of the load 18.

The implementation of this third embodiment provides a method and a winch arrangement 10, for controlling the orientation of a load 18 suspended from a bearing wire 16 about said bearing wire 16 without having to modify the crane 12.

Figure 12:
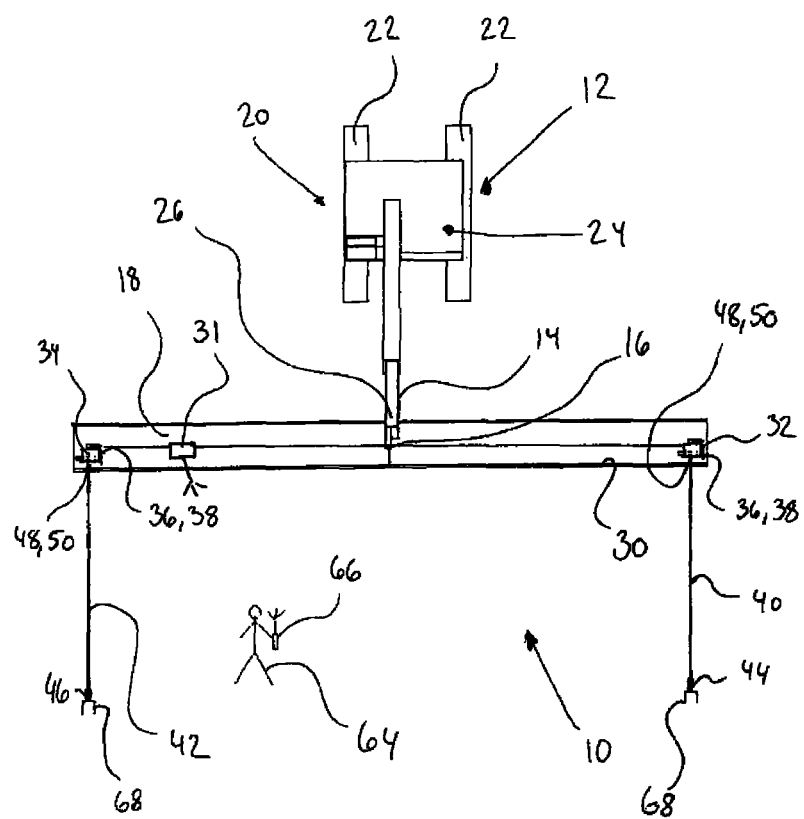
FIG. 12 shows a plan view of a fourth embodiment.

FIG. 12 shows a plan view of a fourth embodiment. The master and slave winches 32, 34 is installed on a support surface provided on the load 18 and attached to the load 18 with attachment means 36, 38. The attachment means 44, 46 of the taglines 40, 42 are connected to a land 68 on the ground. By selectively winding/unwinding the winches 32, 34 the orientation of the bearing wire 16 about the bearing wire 16 is controlled. A user 64 is providing user input to the control system 31 through an input console 66, which is wirelessly connected to the control system 31.

The master and slave winches 32, 34 may be attached to the lifting frame instead of the load.

The implementation of the fourth embodiment provides a method and a winch arrangement 10, for controlling the orientation of a load 18 suspended from a bearing wire 16 about said bearing wire 16 without having to modify the crane 12.

The invention claimed is:

1. A method of controlling the orientation of a load (18), the load comprising a wind turbine blade, the load being suspended from a bearing wire (16) about said bearing wire (16), comprising the following steps:
   a.—providing a winch arrangement (10), comprising; one master winch (32), one slave winch (34) and a winch control system (31), each of said winches (32, 34) having a winch motor (58) and a bi-directional rotational spool (54) with a tagline (40, 42), wherein the winches (32, 34) are placed on a support surface, a ground, a crane, or the load, wherein each tagline (40, 42) is provided with attachment means (44, 46), wherein the taglines (40, 42) are arranged for applying a controlled torque to the load (18) about the bearing wire (16), and wherein the control system (31) comprises tension sensor means (48) for determining tagline tension and spool rotation sensor means (50) for determining spool rotation, and wherein the control system (31) is controllably connected to each winch motor (58) for controlling spool rotation,
   b1.—placing the winches (32, 34) free of the load (18) on the crane, or on the ground next to the crane, or on a ship deck next to the crane and connecting the tagline by the attachment means (44, 46) to the load (18), or
   b2.—placing the winches (32, 34) on the load (18) and connecting the tagline by the attachment means (44, 46) to a land (68),
   c.—presetting tagline tension levels in the control system and under autonomous control of the control system rotating the winch spools (54), until preset tagline tension levels are sensed in the two taglines (40, 42) by the tension sensor means (48),
   d.—during operation of the crane by a crane operator with the bearing wire (16) causing horizontal and/or vertical movement of the load (18), continuously operating the tension sensor means and the spool rotation sensor means for providing feedback of the operation in the control system; based on said feedback and under automatic and autonomous control of the control system, without input from the crane operator, rotating the spools (54) with a rotation speed that maintains the preset tagline tension levels during said horizontal and/or vertical movement of the load (18) for applying a controlled torque about the bearing wire and thereby maintaining a desired orientation of the load (18) suspended from the bearing wire (16) about said bearing wire (16), wherein the maintaining of the preset tagline tension levels comprises automatically and autonomously without interference by an operator increasing the tension at the master winch to the preset tagline tension level of the master winch by winding the tagline by the master winch if the tension during the movement decreases below the preset tension level of the master winch, and decreasing the tension at the master winch to the preset tagline tension level of the master winch by unwinding the tagline by the master winch if the tension during the movement increases above the preset tension level of the master winch; wherein the slave winch is set to follow the master winch to assist in maintaining the preset tension level of the tagline of the master winch;
   e.—relieving the tagline tension by rotating the spools (54), and
   f.—disconnecting the attachment means (44, 46).

2. A method according to claim 1, wherein in step c., the spools (54) are rotated simultaneously.

3. A method according to claim 1, wherein in step d., the method comprises, after having maintained a desired orientation of the load (18) under autonomous control of the control system (31) during horizontal and/or vertical movement of the load (18), providing an input to the control system (31) for changing the orientation of the load (18) about said bearing wire (16); as a consequence of the input causing adding/subtracting a rotation speed component to/from the rotation speed applied to the slave winch spool (54), for thereby changing the orientation of the load (18) suspended from the bearing wire (16) about said bearing wire (16).

4. A method according to claim 3, wherein said input is user input or pre-programmed input or automatic input from distance measuring equipment.

5. A method according to claim 1, wherein the method comprises further steps between step a. and b.:

a'.—providing each winch (32, 34) with winch attachment means (36) for attachment of each winch (32, 34) to the support surface, a".—providing the support surface for each winch (32, 34), and a'".—attaching each winch attachment means (36) to each support surface.

6. A method according to claim 5, wherein the support surface is provided on the load (18), a lifting frame (30), a ship deck or on the ground.

7. A method according to claim 1, wherein the method further comprises the steps of providing a spool torque sensor means for measuring the spool torque and converting the spool torque to tagline tension, for determining tagline tension.

8. A method according to claim 1, wherein the method further comprises the steps of providing a strain gauge on each tagline for measuring the strain in each tagline and converting the tagline strain to tagline tension, for determining tagline tension.

9. A winch arrangement (10) in combination with a load, the load comprising a wind turbine blade, the winch arrangement being configured for controlling orientation of the load (18) suspended from a bearing wire (16) about said bearing wire (16), the bearing wire extending from a crane boom (14) of a crane, the winch arrangement comprising; winches (32, 34) and a winch control system (31), each of said winches (32, 24) having a winch motor (58) and a bi-directional rotational spool (54) with a tagline (40, 42) not engaging the bearing wire or the crane boom, wherein the winches (32, 34) are placed on a support surface, or a ground, or a ship deck, or the crane, or the load, wherein each tagline (40, 42) is provided with attachment means (44, 46) for attachment and for applying a controlled torque to the load (18) about the bearing wire (16), wherein the winches comprise one master winch (32) and one slave winch (34), and wherein the control system (31) comprises tension sensor means (48) for determining tagline tension and spool rotation sensor means (50) for determining spool rotation, and wherein the control system (31) is controllably connected to each winch motor (58) for controlling spool rotation; wherein the control system contains preset tagline tension levels; wherein the control system is configured for continuously operating the tension sensor means and the spool rotation sensor means for providing continuous feedback in the control system of horizontal and/or vertical movement of the load (18); wherein the control system is configured for autonomous control, on the basis of the feedback, of the rotation of the winch spools (54) with rotation speed that maintains the preset tagline tension levels during said horizontal and/or vertical movement of the load (18) for maintaining a desired orientation of the load (18) suspended from the bearing wire (16) about said bearing wire (16).

10. A winch arrangement (10) according to claim 9, wherein the connection between the control system (31) and the sensors (48, 50) and/or the control system (31) and each winch motor (58) is wireless.

11. A winch arrangement (10) according to claim 9, wherein the control system (31) further comprises an input console (66) for receiving user input for change of the orientation of the load.

12. A method according to claim 1, wherein the wind turbine blade is oriented horizontal.

13. A method according to claim 3, wherein the method comprises further lifting or lowering of the load while changing the orientation of the load, wherein the control system is processing the input and thereby autonomously compensating the rotation of the winches for the influence of further lifting or lowering of the load while changing the orientation of the load.

14. A method according to claim 1, wherein the taglines (40, 42) are passing extending from the tagline winches to the load (18) and thereby extending freely and remotely bypassing and not engaging the crane boom (14).

15. A method according to claim 1, wherein the winches (32, 34) are placed on the crane remotely from the crane boom (14).

16. A winch arrangement (10) according to claim 9, wherein the winches (32, 34) are on the crane remote from the crane boom (14).

17. A winch arrangement (10) according to claim 9, wherein the taglines (40, 42) are extending from the winch to the load (18) and extending freely and remotely bypassing the crane boom (14).

18. A winch arrangement (10) in combination with a load, the load comprising a wind turbine blade, the winch arrangement being configured for controlling the orientation of a load (18) suspended from a bearing wire (16) about said bearing wire (16), the bearing wire extending from a crane boom (14) of a crane; the winch arrangement comprising one master winch (32) and one slave winch (34) and a winch control system (31); each of said winches (32, 24) having a winch motor (58) and a bi-directional rotational spool (54) with a tagline (40, 42) for applying a controlled torque to the load (18) about the bearing wire (16); wherein each tagline (40, 42) is provided with attachment means (44, 46) for attachment of the tagline; and wherein the control system (31) comprises tension sensor means (48) for determining tagline tension and spool rotation sensor means (50) for determining spool rotation; wherein a) the winches (32, 34) are provided on a support surface, or a ground, or a ship deck, or the crane remote from the crane boom; each tagline (40, 42) extending from the winch to the load (18) and extending freely and remotely bypassing and not engaging the crane boom (14); or wherein b) winches (32, 34) are provided on the load; each tagline (40, 42) extending from the winch to a land and extending freely and remotely bypassing and not engaging the crane boom (14).

19. A load suspension control method comprising:

providing a crane having a crane boom and a bearing wire, suspending a load from the bearing wire, the load comprising a wind turbine blade, providing a winch arrangement comprising a master winch and a slave winch, providing a first winch motor and a second winch motor, providing a first bi-directional rotational spool on the master winch, driving the first bi-directional rotational spool with the first winch motor, providing a second bi-directional rotational spool on the slave winch, driving the second bi-directional rotational spool with the second winch motor, providing a first spool rotation sensor for the master winch, providing a second spool rotation sensor for the slave winch, providing a first tagline for the master winch extending from the first bi-directional spool, providing a second tagline for the slave winch extending from the second bi-directional spool, providing a first tension sensor along the first tagline and a second tension sensor along the second tagline, attaching the first tagline with a first attachment to a first position on the load independent of, spaced from and not engaging the crane boom or the bearing wire, attaching the second tagline with a second attachment to a second position on the load independent of, spaced from and not engaging the crane boom or the bearing wire, providing an automatically operating autonomous winch control system, functionally connecting the winch control system to the first motor, the first spool rotation sensor, the first tension sensor, the second motor, the second spool rotation sensor, and the second tension sensor, presetting first tagline tension levels in the control system, presetting second tagline tension levels in the control system, applying controlled torque to the load about the bearing wire with the first tagline and the second tagline with the winch control system, controlling the first winch motor and rotation of the first winch spool of the first tagline with the winch control system, determining a first spool rotation of the first tagline with the first spool rotation sensor, controlling the second winch motor and rotation of the second winch spool of the second tagline with the winch control system, determining a second spool rotation of the second tagline with the second spool rotation sensor, sensing a first tagline tension of the first tagline with the first tension sensor and a second tagline tension of the second tagline with the second tension sensor, controlling the rotation of the first winch spool with the control system until the preset tagline tension levels are sensed in the first tagline by the first tension sensor, controlling the rotation of the second winch spool with the control system until the preset tagline tension levels are sensed in the second tagline by the second tension sensor, moving the load during operation of the crane with the bearing wire, continuously operating the first and the second tension sensors and the first and the second spool rotation sensors, providing feedback of the continuously operating to the winch control system, automatically, independently and autonomously operating the winch control system responsive to the feedback provided, rotating the first winch spool and the second winch spool with respective rotation speeds, maintaining the preset first tagline and second tagline tension levels during the moving of the load, maintaining a desired orientation of the load suspended from the bearing wire about the bearing wire, relieving the first tagline tension levels by rotating the first winch spool, relieving the second tagline tension levels by rotating the second winch spool, and disconnecting the first tagline and the second tagline from the load.

20. The method of claim 19, wherein the providing the master winch and the slave winch further comprises disposing the master winch and the slave winch in positions selected from the group consisting of on the crane, on areas proximal the crane, on a ship deck proximal the crane, or on the load.

21. The method of claim 19, wherein the moving the load comprises moving the load in movements selected from the group consisting of horizontal, vertical, or combinations thereof.

* * * * *